(12) United States Patent
Nylen (10) Patent No.: US 9,184,619 B2
(45) Date of Patent: Nov. 10, 2015

(54) ACCESSORY SPEAKER WITH WIRELESS CHARGER FOR MOBILE DEVICE

(75) Inventor: Tuomas Nylen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 75 days.

(21) Appl. No.: 13/418,471

(22) Filed: Mar. 13, 2012

(65) Prior Publication Data

US 2013/0241735 A1    Sep. 19, 2013

(51) Int. Cl.
*H02J 7/02*     (2006.01)
*H02J 5/00*     (2006.01)
*H04M 1/04*     (2006.01)
*H04M 1/60*     (2006.01)
*H04M 1/725*    (2006.01)

(52) U.S. Cl.
CPC .............. *H02J 7/025* (2013.01); *H02J 5/005* (2013.01); *H04M 1/04* (2013.01); *H04M 1/6041* (2013.01); *H04M 1/7253* (2013.01)

(58) Field of Classification Search
CPC .......... H02J 7/0047; H02J 7/00; H02J 7/025; H02J 7/0042; H01M 10/46
USPC ............... 340/636.1, 636.2, 539.13, 686.6; 320/108, 107; 455/41.1, 41.2, 573
See application file for complete search history.

(56) References Cited

U.S. PATENT DOCUMENTS

| | | | |
|---|---|---|---|
| 6,077,167 A * | 6/2000 | Ciniello | 473/54 |
| 6,226,536 B1 * | 5/2001 | Miyashita | 455/567 |
| 7,370,106 B2 * | 5/2008 | Caveney | 709/224 |
| 2004/0203351 A1 * | 10/2004 | Shearer et al. | 455/41.1 |
| 2008/0224655 A1 | 9/2008 | Tilley et al. | 320/108 |
| 2008/0258679 A1 * | 10/2008 | Manico et al. | 320/106 |
| 2009/0079387 A1 | 3/2009 | Jin et al. | 320/108 |
| 2009/0096413 A1 * | 4/2009 | Partovi et al. | 320/108 |
| 2010/0235006 A1 | 9/2010 | Brown | 700/286 |
| 2010/0270970 A1 | 10/2010 | Toya et al. | 320/108 |
| 2010/0290215 A1 * | 11/2010 | Metcalf et al. | 362/127 |
| 2011/0050164 A1 * | 3/2011 | Partovi et al. | 320/108 |
| 2012/0299966 A1 * | 11/2012 | Kim et al. | 345/660 |

FOREIGN PATENT DOCUMENTS

| | | |
|---|---|---|
| CN | 201813180 U | 4/2010 |
| JP | 2008 141940 A | 6/2008 |
| JP | 2008 301554 A | 12/2008 |
| JP | 2010525785 A | 7/2010 |

* cited by examiner

*Primary Examiner* — Steven Lim
*Assistant Examiner* — Hongmin Fan
(74) *Attorney, Agent, or Firm* — Harrington & Smith (57) ABSTRACT

In accordance with the exemplary embodiments of the invention there are at least a method, apparatus, and executable computer program to perform operations including detecting by an accessory speaker that a mobile device is in proximity to the accessory speaker. In response to the detecting, visually displaying a charging surface on a surface of the accessory speaker, and directing with indicator lights of the charging surface a placement of the mobile device to a specific location of the charging surface to charge the device.

20 Claims, 5 Drawing Sheets

ACCESSORY SPEAKER WITH WIRELESS CHARGER FOR MOBILE DEVICE

TECHNICAL FIELD

The teachings in accordance with the exemplary embodiments of this invention relate generally to wireless charging and, more specifically, relate to at least a method and apparatus to charge a portable electronic device, such as a mobile device, wirelessly using a wireless charger included in an accessory for the mobile device, such as an accessory speaker for the mobile device.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The popularity of portable electronic devices, such as portable computing systems, video cameras, and mobile phones to name only a few, allow users to work and play free of restrictive power cords and chargers for a limited period of time. As people work outside of their traditional office, they often find themselves using their notebook computers, cellular phones, digital assistants and tablet computers. Similarly, people enjoying themselves away from the home take advantage of portable music players, digital cameras, electronic game systems and the like while on travel or doing outdoors activities. These portable electronic devices require rechargeable batteries in order to achieve their mobility.

SUMMARY

In an exemplary aspect of the invention, there is a method comprising detecting with an accessory speaker that a mobile device is in proximity to the accessory speaker; in response to the detecting, visually displaying a charging surface on a surface of the accessory speaker; and directing with indicator lights of the charging surface a placement of the mobile device to a specific location of the charging surface to charge the device.

In another exemplary embodiment of the invention, there is an apparatus comprising: at least one processor; and at least one memory including computer program code, where the at least one memory and the computer program code are configured, with the at least one processor, to cause the apparatus to at least: detect, with an accessory speaker, that a mobile device is in proximity to the speaker; in response to the detecting, visually display a charging surface on a surface of the speaker; and direct with indicator lights of the charging surface a placement of the mobile device to a specific location of the charging surface to charge the device.

In still another exemplary embodiment of the invention there is an apparatus comprising: means for detecting with an accessory speaker that a mobile device is in proximity to the accessory speaker; means, in response to the detecting, for visually displaying a charging surface on a surface of the accessory speaker; and means for directing with indicator lights of the charging surface a placement of the mobile device to a specific location of the charging surface to charge the device.

In accordance with the paragraph above, the means for detecting comprises a proximity sensor, and the means for visually displaying and directing comprises at least one memory embodying computer program code, the computer program code executable by at least one processor.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

An exemplary embodiment of the invention provides a novel and convenient method to charge a portable electronic device, such as a mobile device, wirelessly using a wireless charger included in an accessory for the mobile device, such as an accessory speaker, which is also for use by a user of the mobile device to enable hands-free operation of the device. In addition, the exemplary embodiments provide a novel method to direct placement of the device to a specific location on the wireless charger for optimal charging of the device.

Figure 1:
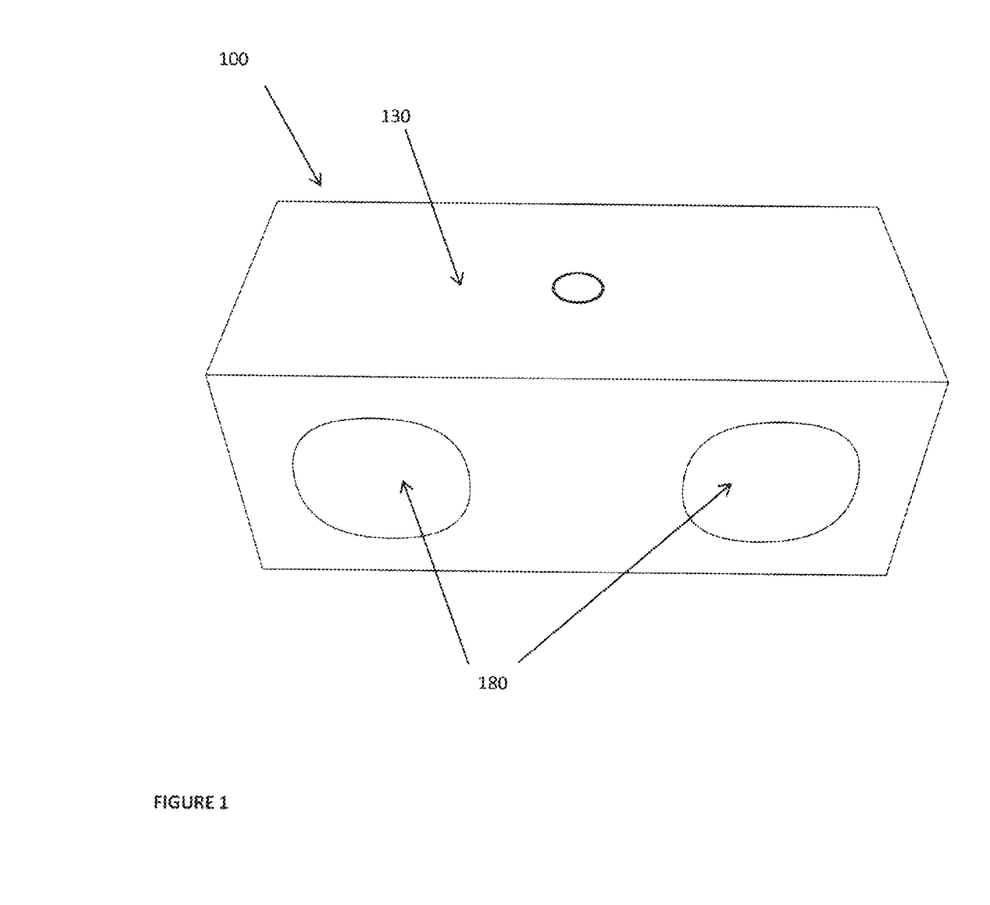
FIGS. 1, 2 and 3 each illustrate a simple line diagram of an accessory speaker for a mobile device, in accordance with the exemplary embodiments of the invention.
Figure 2:
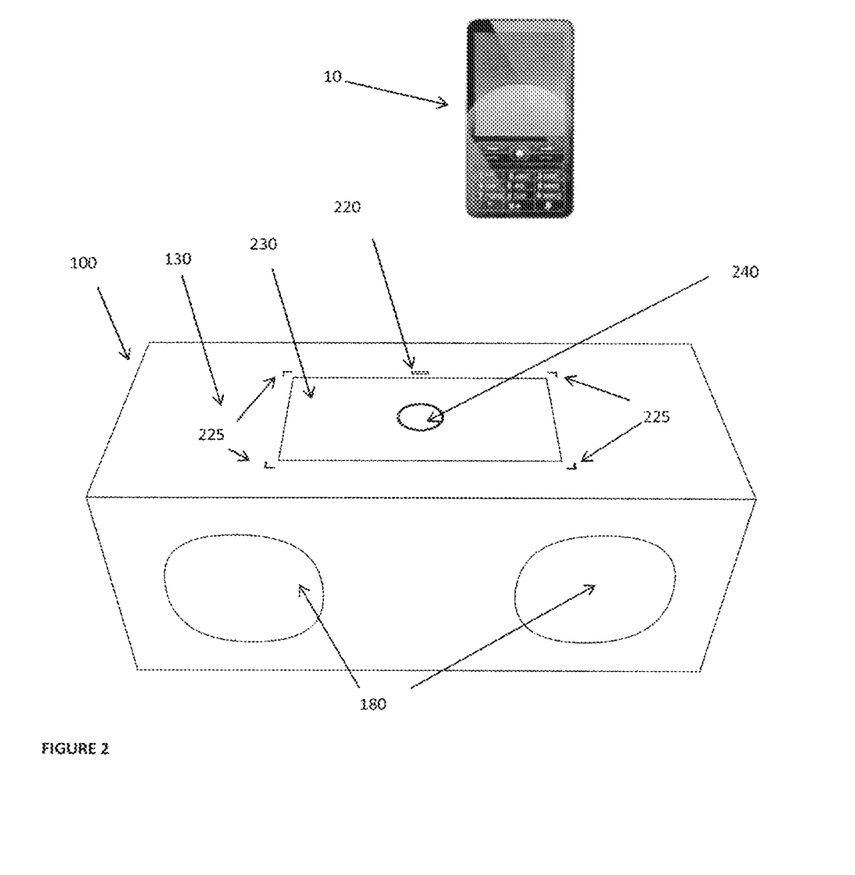
Figure 3:
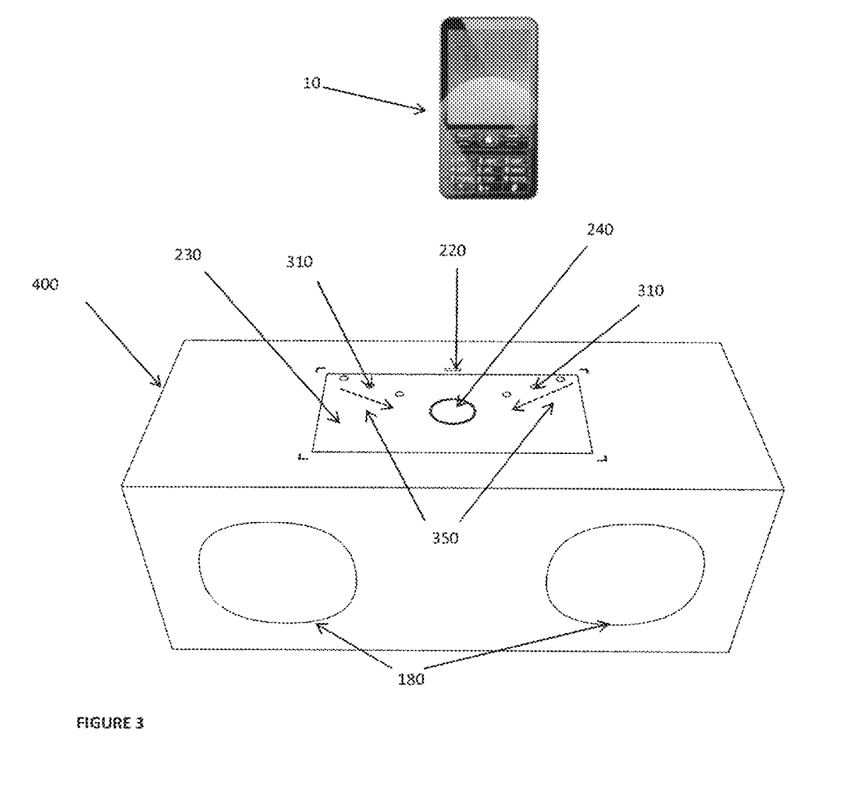

FIGS. 1, 2 and 3 each illustrate simple line drawings of an accessory speaker for a mobile device, in accordance with the exemplary embodiments. The exemplary embodiments of the invention are not limited to use with only accessory speakers for a mobile device. Therefore, any reference herein to an accessory speaker is non-limiting. The exemplary embodiments of the invention may be practiced using other accessories for the mobile device and not just speakers.

FIGS. 1, 2, and 3 are non-limiting example line drawings of an accessory speaker 100 for a mobile device, in accordance with the exemplary embodiments of the invention.

Regarding FIG. 1, the surface 130 of the accessory speaker 100 for a mobile device includes a charging surface. The charging surface is hidden-till-lit in order to present a clean appearance of the surface. This clean surface 130 can be shown when the charging feature of the accessory speaker 100 is not in use. In accordance with the exemplary embodiments of the invention, after a mobile device is detected in proximity of the accessory speaker, the speaker surface 130 will change to visually display the charging surface 230, as shown in FIGS. 2 and 3. Also as illustrated in FIGS. 1, 2 and 3, the accessory speaker for a mobile device includes one or more speakers 180. It is noted that although two speakers are shown in FIGS. 2 and 3, this is non-limiting and there may be one or more speakers in the accessory speaker 100. In addition, the speaker(s) may be arranged at different locations on the accessory speaker unit.

FIG. 2 illustrates further exemplary embodiments of the invention such as the charging surface 230 which is no longer hidden, but is now shown. In accordance with the exemplary embodiments, the charging surface 230 is shown or illuminated in response to a proximity detection of a device, such as the mobile device 10. This detection is performed with the proximity sensor 220. Although FIGS. 2 and 3 illustrate one proximity sensor 220, there can be more than one proximity sensor 220 on one or more surfaces of the accessory speaker 100. Further, as shown in FIG. 2 there is an optimal charging location 240 indicated on the charging surface 230. As shown in FIG. 2, the charging surface 230 can be located on top surface of the accessory speaker 100. Further, as shown by the corners 225 of the charging surface, the charging surface 230 covers a square area which is centralized on the surface 130 of the accessory speaker 100. The mobile device can be placed casually within the corners 225 of the charging surface 230 on the surface of the speaker in order to charge the device. The charging surface may be any dimension which will fit on the surface 130 of the accessory speaker. In addition, the charging surface may be a particular shape or design, such as a rectangle, square, circle, star, oval, just to name a few. In addition, the charging service 230 and/or the optimal charging location 240 can be in a shape customized for a user of the mobile device.

Regarding FIG. 3, there are illustrated light guides 310, which are activated upon proximity detection by the proximity sensor(s) 220. The light guides 310 operate to direct a placement of the mobile device 10 to the optimal charging location 240 on the charging surface 230. There may be one or more light guides 310 and the light guides can be white or other color LEDs under the charging surface 230. Further, the light guides 310 may start from any location of the charging surface 230, such as near where the proximity is detected. In addition, in accordance with the embodiments, the light guide(s) 310 may use indicator patterns of the LEDs to most clearly direct the placement of the mobile device 10 towards the optimal charging location 240. These patterns can include the LEDs starting from the outer edge and subsequent LEDs lighting in a sequence to indicate a direction towards the optimal charging location 240. The use of LEDs for the light guides 310 is non-limiting, and the light guides can be based on any light emitting technology.

As stated above, the reference to an "accessory" in the description, in accordance with the exemplary embodiments, is not limited to a speaker. The accessory with a charging surface for a mobile device can embody any accessory for the mobile device. As non-limiting examples, the accessory can be a separate keyboard, display, docking unit/station, and/or an accessory attachment in a vehicle for example.

It is noted that although the mobile device 10 is shown to be a mobile communication device this is non-limiting, and the mobile device 10 can be any device that supports wireless charging. The proximity sensor 220 may be associated with an indicator light display on the charging surface 230 which flashes or remains solid when there is proximity detection of a device, such as the mobile device 10. In addition, FIG. 2 illustrates light guides 310, which are activated upon a proximity detection, to direct a placement of the mobile device 10 to an optimal charging location 240 on the charging surface 230. In accordance with the embodiments, the light guides 310 may start from any location of the device, such as where the proximity is detected, and progress towards the optimal charging location 240 indicated on the charging surface 230. Further, there may be one or more light guides 310 and the light guides can be white or other color light emitting diodes (LEDs) under the charging surface 230. In addition, in accordance with the embodiments, as illustrated with the dashed arrows 350 running parallel with the light guides 310, the light guide 310 may use indicator patterns of the LEDs to most clearly direct the placement of the mobile device 10 towards the optimal charging location 240. These patterns can include the LEDs starting from the outer edge and subsequent LEDs lighting in a sequence to indicate a direction towards the optimal charging location 240.

Figure 4:
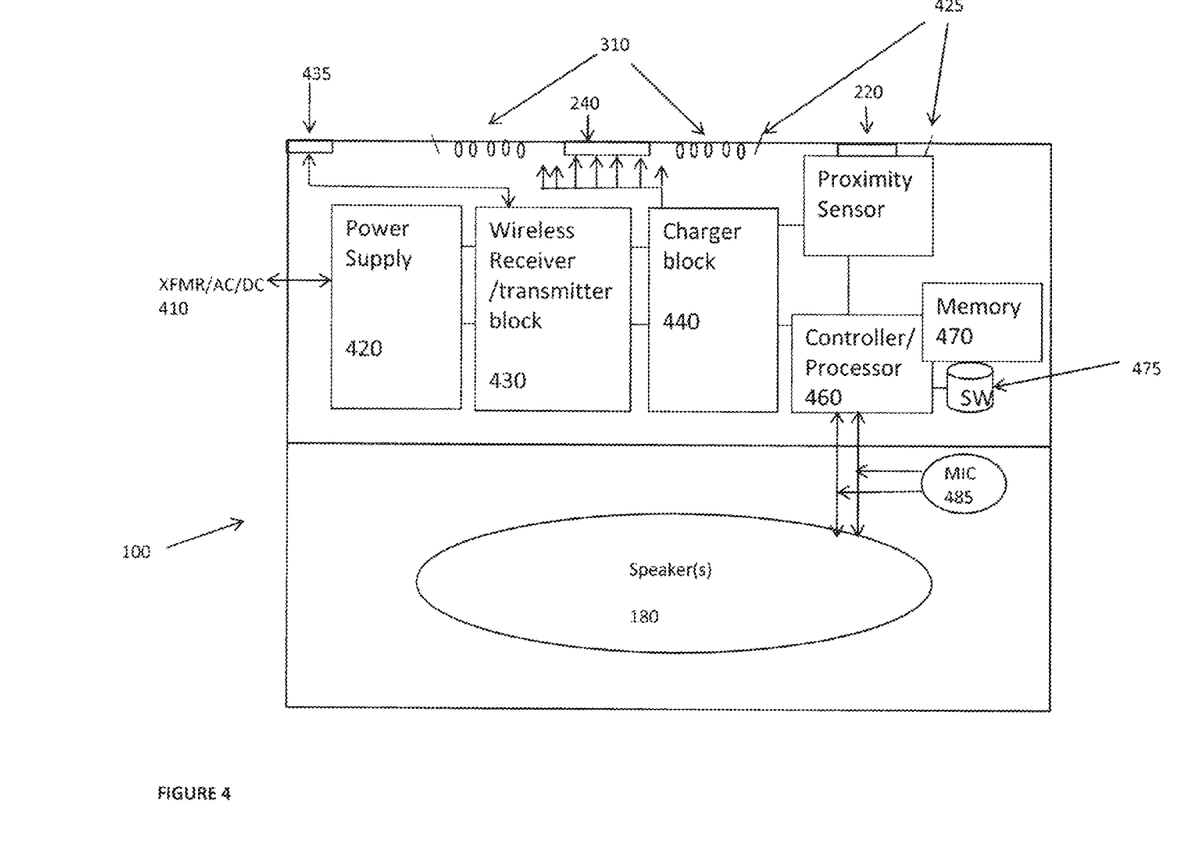
FIG. 4 illustrates an example circuit block design of an accessory speaker charging unit, in accordance with the embodiments of the invention.

In FIG. 4 there is illustrated a simple component schematic of a wireless charging surface 230 of the accessory speaker 100. In FIG. 4 there is a power supply 420 which may be powered by any of a transformer, AC power source, and/or DC power source 410. In addition, there is a wireless receiver/transmitter block 430 which receives signals from the mobile device 10 via the wireless interface 435. The wireless receiver/transmitter block 430 is configured to interface with the mobile device as placed on the charging surface 230 to facilitate an operational substitute of at least a microphone and/or speaker functionality of the mobile device 10 using the speaker(s) 180 and/or the microphone 485 of the accessory speaker 100. The operations in accordance with the embodiments allow a user to operate the mobile device placed on the charging surface in a hands-free mode. In addition, the embodiments allow a user to wirelessly receive and transmit signaling with the mobile device while the mobile device is on the charging surface. For example, the user can answer and/or place a call or the user can listen to music from the mobile device with the accessory speakers 180 and the microphone 485 of the accessory speaker 100. The receiver/transmitter block 430 and the wireless interface 435 may be based on cellular, Wi-Fi, Bluetooth, infrared, or any other signaling communication technology.

Illustrated in FIG. 4 there is a charger block 440. The charger block 440 includes components which may include an AC-DC or other converter and any other components needed to charge the mobile device 10. In addition, the charger block 440 is configured to receive charging feedback signals which may be used to control whether the charging current is, or continues to be, sent to the device via the charging surface 230 and/or the optimal charging location 240. The charging surface 230 and the optimal charging location 240 provide the charging current to the device. The charging surface 230 whose edges are illustrated by either of the slanted lines 425. Further with regards to FIG. 4, a detected proximity of the mobile device 10 by the proximity sensor 220 will be processed by a processor, such as the controller processor 460. It is noted that at least the sensor portion of the proximity sensor 220 may be within or outside the charging surface 230. The controller/processor 460 is connected to the memory 470 which may embody the computer readable code or software (SW) 475. The controller processor 460 can be configured to use SW 475 to execute the operations in accordance with the exemplary embodiments as described herein.

In addition, in accordance with the embodiments, once the mobile device is placed on the charging surface 230 the charging surface will illuminate entirely or partially to indicate a charge status of the device. For example, the charging surface 230 may be red upon the placement of the mobile device, the red color indicating that the device is charging. Then, when charging is complete the charging surface 230 will turn green to indicate that the device is fully charged. In addition, a user can configure the charging surface 230 to no longer be illuminated after a period of time, for example after 1 minute following the completion of the charging. Further, in accordance with the exemplary embodiments, the illumination can have a "breathing light" type effect. For example, when the charging is on-going, the light breaths, such as blinking on and off completely or dimming or any combination thereof in order to show different levels of charging. When the device has been fully charged, the light may be constant or present a different pattern or breathing light effect. These light effects may be for a period of time, such as until the charging circuitry enters a sleep mode.

In accordance with another exemplary embodiment of the invention, when the mobile device 10 is fully charged, power from the charging block 440 which is being transferred to the charging surface 230 of the accessory speaker 100 is switched off. When the proximity sensor 220 detects another device, such as the mobile device 10, the charging circuitry leaves the sleep mode and the operations, as at least described above, will be performed. In accordance with another embodiment of the invention, this leaving the sleep mode can occur even if the mobile device 10 remains on the charging surface 230 and it is again detected, such as with the charging block 440, that the device requires charging. This feature is beneficial at least for the reason that it does not require that the charging receiver be removed from the charging transmitter and replaced again to again start charging.

In more general terms the accessory speaker 100, or another accessory with a charging surface for a mobile device, as in accordance with the embodiments, may be considered to include at least one controller and data processor, such as a controller/processor 460, a memory medium tangibly embodied as a computer readable memory that stores a program of computer program code, which may or may not be the same as the memory 470 storing the described SW 475. That is, the SW 475 may reside in some other memory of the accessory speaker with a charging surface 230. Wherever stored, at least one of the SW 475 is assumed to include program instructions that, when executed by the associated controller/processor 460, enable the mobile device 10 to operate in accordance with the exemplary embodiments of this invention, as will be discussed above in greater detail. That is, the exemplary embodiments of this invention may be implemented at least in part by stored computer software executable by at least one processor of the accessory speaker (or other accessory) for the accessory speaker or by hardware, or by a combination of stored software and hardware (and/or stored firmware).

Figure 5:
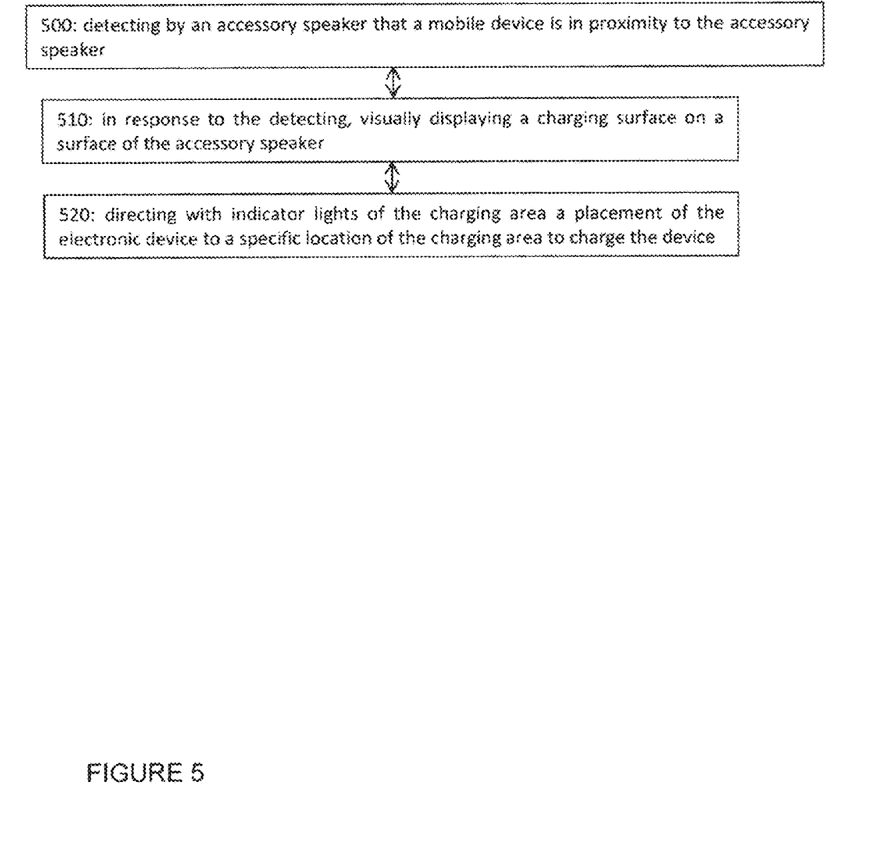
FIG. 5 is a logic flow diagram that illustrates the operation of a method and a result of execution of computer program instructions embodied on a non-transitory computer readable memory, in accordance with the exemplary embodiments of this invention.

FIG. 5 is a logic flow diagram that illustrates the operation of a method, and a result of execution of computer program instructions, further in accordance with the exemplary embodiments of this invention. In accordance with these exemplary embodiments a method performs, at Block 500, there is a step of detecting by an accessory speaker that a mobile device is in proximity to the accessory speaker. At Block 510 there is a step in response to the detecting, of visually displaying a charging surface on a surface of the accessory speaker. At Block 520 there is a step, directing with indicator lights of the charging surface a placement of the mobile device to a specific location of the charging surface to charge the device.

In accordance with the exemplary embodiments as described in regards to FIG. 5 above, the accessory speaker comprises at least one speaker and a microphone, and the accessory speaker enables a user to operate the mobile device via at least one of the at least one speaker and the microphone in a hands-free manner while the device is in the proximity of the accessory speaker.

In accordance with the exemplary embodiments as described in the paragraph above, the directing with the indicator lights comprises illuminating in a sequence on the charging surface light emitting diodes, where the sequence is to direct the placement of the device by the user to the specific location of the charging surface.

Further, in accordance with the exemplary embodiments as described in the paragraphs above, the charging surface comprises indicator lights to indicate charging status and charging completed status.

Further, in accordance with the exemplary embodiments as described in the paragraphs above, the visually displaying the charging surface comprises illuminating the charging surface.

In accordance with the exemplary embodiments as described in the paragraph above, there is detecting that the device is no longer in proximity to the accessory speaker; and in response to the detecting that the device is no longer in proximity to the accessory speaker, turning off the illumination of the charging surface.

Further, in accordance with the exemplary embodiments as described in the paragraphs above, the specific location of the charging surface is the optimal location of the charging surface to charge the device.

In accordance with the exemplary embodiments as described in the paragraphs above, the charging surface is not visually displayed on the surface of the accessory speaker prior to the detecting.

Further, in accordance with the exemplary embodiments as described in the paragraphs above, the portable mobile device is one of a cellular phone, a smart phone, a personal data assistant, and a portable computer.

Embodiments of this invention may be implemented in a device or devices by hardware circuitry such as integrated circuitry and/or other circuitry, by computer software executable by hardware circuitry, or by a combination of software and hardware circuitry. Further in this regard it should be noted that the various blocks of the logic flow diagram of FIG. 5 may represent interconnected logic circuits, blocks, functions, program steps, or a combination of logic circuits, blocks, functions, and program steps for performing the specified tasks.

In general, the device, such as the mobile device, may have wireless capabilities and the various embodiments of the device can include, but are not limited to, cellular telephones, personal digital assistants (PDAs), portable computers, image capture devices such as digital cameras, gaming devices, music storage and playback appliances, Internet appliances permitting Internet access and browsing, as well as portable units or terminals that incorporate combinations of such functions.

The memory or memories of the device implementing the embodiments of the invention may be of any type suitable to the local technical environment and may be implemented using any suitable data storage technology, such as semiconductor-based memory devices, magnetic memory devices and systems, optical memory devices and systems, fixed memory and removable memory. The data processor of the device or charging system may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Still further, the various names and parameters used for the contacts of the charging interface, for the different types of signaling, and for the components which enable any exemplary embodiments of this invention are not intended to be limiting in any respect, as these names and parameters may be identified by any suitable name or parameter.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, any of the features of any exemplary embodiments of this invention as described above could be used to advantage without the corresponding use of other features. As such, the foregoing description should be considered as merely illustrative of the principles of the invention, and not in limitation thereof.

What is claimed is:

1. A method comprising:
    directing with indicators to a specific location of a charging surface of a top surface of an accessory speaker a placement of a mobile device at the specific location;
    detecting with the accessory speaker that the mobile device is in proximity to the charging surface of the top surface of the accessory speaker;
    in response to the detecting, initiating the charging surface of the top surface of the accessory speaker to charge the mobile device, where the accessory speaker is configured to wirelessly interface with the mobile device placed on the charging surface to facilitate an operational substitute of at least a microphone and a speaker functionality of the mobile device using the accessory speaker; and
    illuminating in a sequence on the charging surface light emitting diodes, where the sequence is to direct the placement of the mobile device to the specific location of the charging surface.

2. The method according to claim 1, where the accessory speaker comprises at least one speaker and a microphone, and where the accessory speaker enables a user to operate the mobile device in a hands-free manner via the accessory speaker while the mobile device is associated with the charging surface.

3. The method according to claim 1, where the charging surface comprises indicator lights to indicate charging status and charging completed status.

4. The method according to claim 1, where the initiating the charging surface comprises illuminating the charging surface.

5. The method according to claim 4, further comprising
    detecting that the mobile device is no longer in proximity to the charging surface; and
    in response to the detecting that the mobile device is no longer in proximity to the charging surface, turning off the illumination of the charging surface.

6. The method according to claim 1, where the specific location of the charging surface is an optimal location of the charging surface to charge the mobile device.

7. The method according to claim 1, where the sequence comprises the indicator lights blinking and dimming in a manner to direct the placement.

8. A non-transitory computer readable memory embodying computer program code, the computer program code executed by at least one processor to perform the method as in claim 1.

9. An apparatus comprising:
    at least one processor; and
    at least one non-transitory memory including computer program code, where the at least one memory and the computer program code are configured, with the at least one processor, to cause the apparatus to at least:
    direct with indicators to a specific location of a charging surface of a top surface of an accessory speaker a placement of a mobile device at the specific location;
    detect, with the accessory speaker, that the mobile device is in proximity to the charging surface of the top surface of the accessory device speaker;
    in response to the detecting, initiate the charging surface of the top surface of the accessory speaker to charge the mobile device, where the accessory speaker is configured to wirelessly interface with the mobile device placed on the charging surface to facilitate an operational substitute of at least a microphone and a speaker functionality of the mobile device using the accessory speaker; and
    illuminate in a sequence on the charging surface light emitting diodes, where the sequence is to direct the placement of the mobile device to the specific location of the charging surface.

10. The apparatus according to claim 9, where the accessory speaker comprises at least one speaker and a microphone, and where the at least one non-transitory memory including the computer code is configured, with the at least one processor, to cause the apparatus, with the accessory speaker, to enable a user to operate the mobile device in a hands-free manner via the accessory speaker while the mobile device is associated with the charging surface.

11. The apparatus according to claim 9, where the sequence comprises the indicator lights blinking and dimming in a manner to direct the placement.

12. The apparatus according to claim 9, where the initiating the charging surface comprises an illumination of the charging surface.

13. The apparatus according to claim 12, where the at least one non-transitory memory including the computer code is configured, with the at least one processor, to cause the apparatus to:
  detect that the mobile device is no longer in proximity to the charging surface; and
  in response to the detecting that the mobile device is no longer in proximity to the charging surface, to turn off the illumination of the charging surface.

14. The apparatus according to claim 9, where the specific location of the charging surface is the optimal location of the charging surface to charge the mobile device.

15. The apparatus according to claim 9, where the mobile device is one of a cellular phone, a smart phone, a personal data assistant, and a portable computer.

16. The method according to claim 1, where the accessory speaker comprises more than one speaker, and where the more than one speaker can play music from the mobile device while the mobile device is charging.

17. The method according to claim 1, where the specific location directed to by the indicators on the charging surface is centralized on the top surface of the accessory speaker.

18. The method according to claim 17, where the directing with indicators comprises directing with markings at each of four corners of a rectangular area identifying the specific location centralized on the top surface of the accessory speaker.

19. The method according to claim 18, where the placement of the mobile device comprises placement of one of a front or a back of the mobile device on the rectangular area to charge the mobile device.

20. The method according to claim 18, where a long side of the rectangular area identifying the specific location centralized on the top surface of the accessory speaker is parallel with a front of the accessory speaker.

* * * * *

UNITED STATES PATENT AND TRADEMARK OFFICE
CERTIFICATE OF CORRECTION

PATENT NO. : 9,184,619 B2  Page 1 of 1
APPLICATION NO. : 13/418471
DATED : November 10, 2015
INVENTOR(S) : Nylen It is certified that error appears in the above-identified patent and that said Letters Patent is hereby corrected as shown below:

In the Claims
Claim 18, col. 10, line 8 "comers" should be deleted and --corners-- should be inserted.

Signed and Sealed this
Seventeenth Day of May, 2016

Michelle K. Lee
*Director of the United States Patent and Trademark Office*